Oct. 18, 1966 R. W. SIMPSON 3,280,272

MUTING SWITCH MECHANISM FOR AUTOMATIC RECORD CHANGERS

Filed Jan. 22, 1964 4 Sheets-Sheet 1

INVENTOR.
Richard W. Simpson
BY
Brown, Jackson, Boettcher & Dienner
Att'ys

MUTING SWITCH MECHANISM FOR AUTOMATIC RECORD CHANGERS

Filed Jan. 22, 1964

4 Sheets-Sheet 2

INVENTOR.

Richard W. Simpson

BY

Brown, Jackson, Boettcher & Dienner

Att'ys.

Oct. 18, 1966 R. W. SIMPSON 3,280,272

MUTING SWITCH MECHANISM FOR AUTOMATIC RECORD CHANGERS

Filed Jan. 22, 1964 4 Sheets-Sheet 3

INVENTOR.
Richard W. Simpson
BY
Brown, Jackson, Boettcher & Dienner
Att'ys.

MUTING SWITCH MECHANISM FOR AUTOMATIC RECORD CHANGERS

Filed Jan. 22, 1964

INVENTOR.

Richard W. Simpson

BY

Brown, Jackson, Boettcher & Dienner

Att'ys

United States Patent Office 3,280,272

Patented Oct. 18, 1966

3,280,272
MUTING SWITCH MECHANISM FOR AUTOMATIC RECORD CHANGERS

Richard W. Simpson, Stevensville, Mich., assignor to V-M Corporation, Benton Harbor, Mich., a corporation of Michigan Filed Jan. 22, 1964, Ser. No. 339,536
14 Claims. (Cl. 179—100.4)

The present invention relates to an improved muting switch arrangement for automatic record changers for preventing the noise which is created by the record changer mechanism during a change cycle from being amplified and transmitted through the cartridge and speaker system.

Automatic record changers are adapted to automatically play a plurality of records seriatim, and as is known in the art such changers are designed so that upon the completion of the playing of a record, the tone arm is automatically lifted from the played record and swung radially outwardly, and the lowermost one of a stack of unplayed records supported on the spindle is then dropped to the turntable for playing, after which the tone arm is set down in initial playing position on the record. While there are various mechanisms for accomplishing the foregoing operations during the change cycle, it is common to provide a large diameter drive gear which is adapted to drive the various components for actuating the tone arm and record dropping means, such drive gear normally being stationary and being rotated one full revolution during a record change cycle.

In an automatic record changer as described above, the rotation of the main drive gear and the movement and interengagement of the various other mechanical components during a record change cycle, as well as the actual dropping of the record to be played, all create undesirable noise which can be transmitted by the cartridge to the amplifier and thus to the speakers. Accordingly, while the creation of such noise is inevitable, it is highly desirable to provide muting means for preventing such noise from being amplified and transmitted through the speaker system during the record change cycle.

Certain muting arrangements have heretofore been proposed, but they have not been extensively adopted, since they have been relatively expensive and have added significantly to the cost of a record changer. While some known systems are more elaborate and proportionately more expensive than others, they have in common that they require wiring and soldering operations for installation, and this certainly contributes measurably to the overall cost. That is, with known forms of muting arrangements, separate wiring is required to the switch.

It is an object of the present invention to provide an improved muting switch arrangement which can be installed on an automatic record changer without need for any wiring or soldering operations.

In furtherance of the foregoing object, I provide a muting switch which is mounted directly on the phono jack of the record changer and which comprises a pair of wiper blades which contact the barrels of the phono sockets when the switch is moved to closed position so as to ground the system and prevent any noise from being transmitted. The switch mechanism includes a rotor member which carries the pair of wiper blades and which is biased to open position, and cam and lever means are provided to move the rotor to closed position during a record change cycle. The wiper blade structure which is carried on the rotatable rotor member is maintained in constant sliding contact with a ground lug of the phono jack so that the wiper blades are maintained grounded without any additional wiring, and by moving such blades into contact with the barrels of the phono sockets the system is grounded.

Accordingly, it is a more specific object of the present invention to provide a combined phono jack and muting switch arrangement for an automatic record changer whereby no wires are connected to the switch, and the muting switch and related actuating mechanism can be applied to any record changer without the necessity of adjustment or rearrangement of wires.

Other objects and advantages of my invention will be apparent from the following description of a preferred embodiment, taken in conjunction with the accompanying drawings in which.

Figure 1:
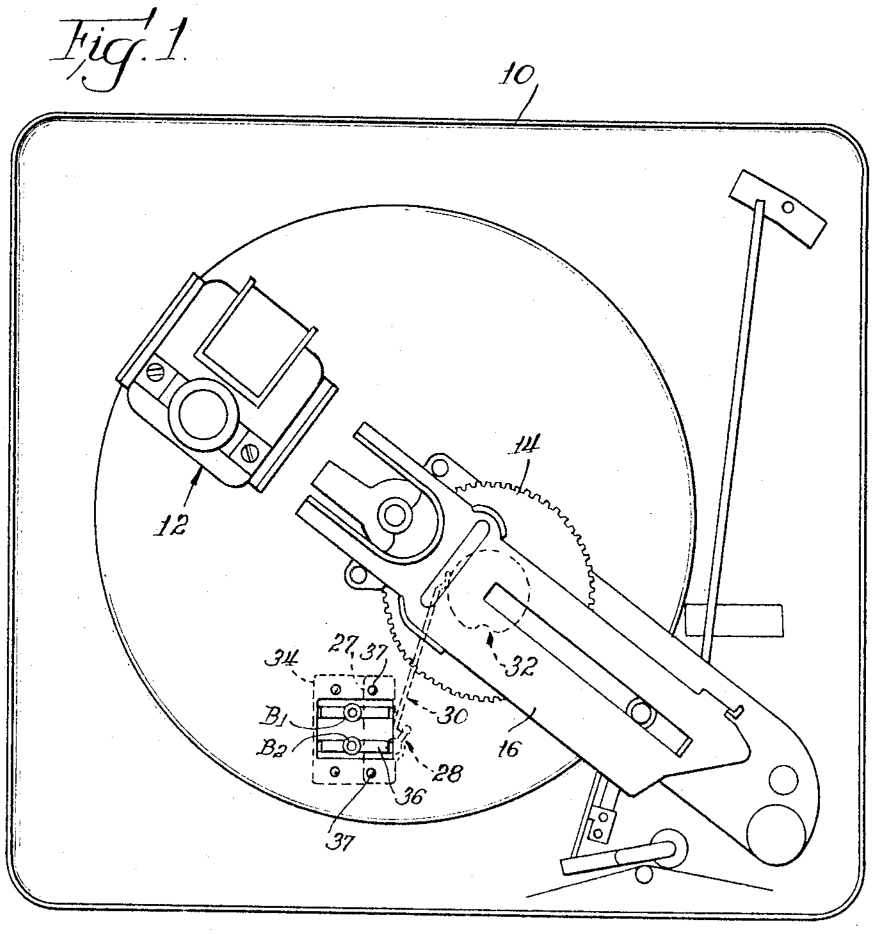
FIGURE 1 is a bottom plan view of an automatic record changer equipped with the improved muting switch arrangement of the present invention.
Figure 2:
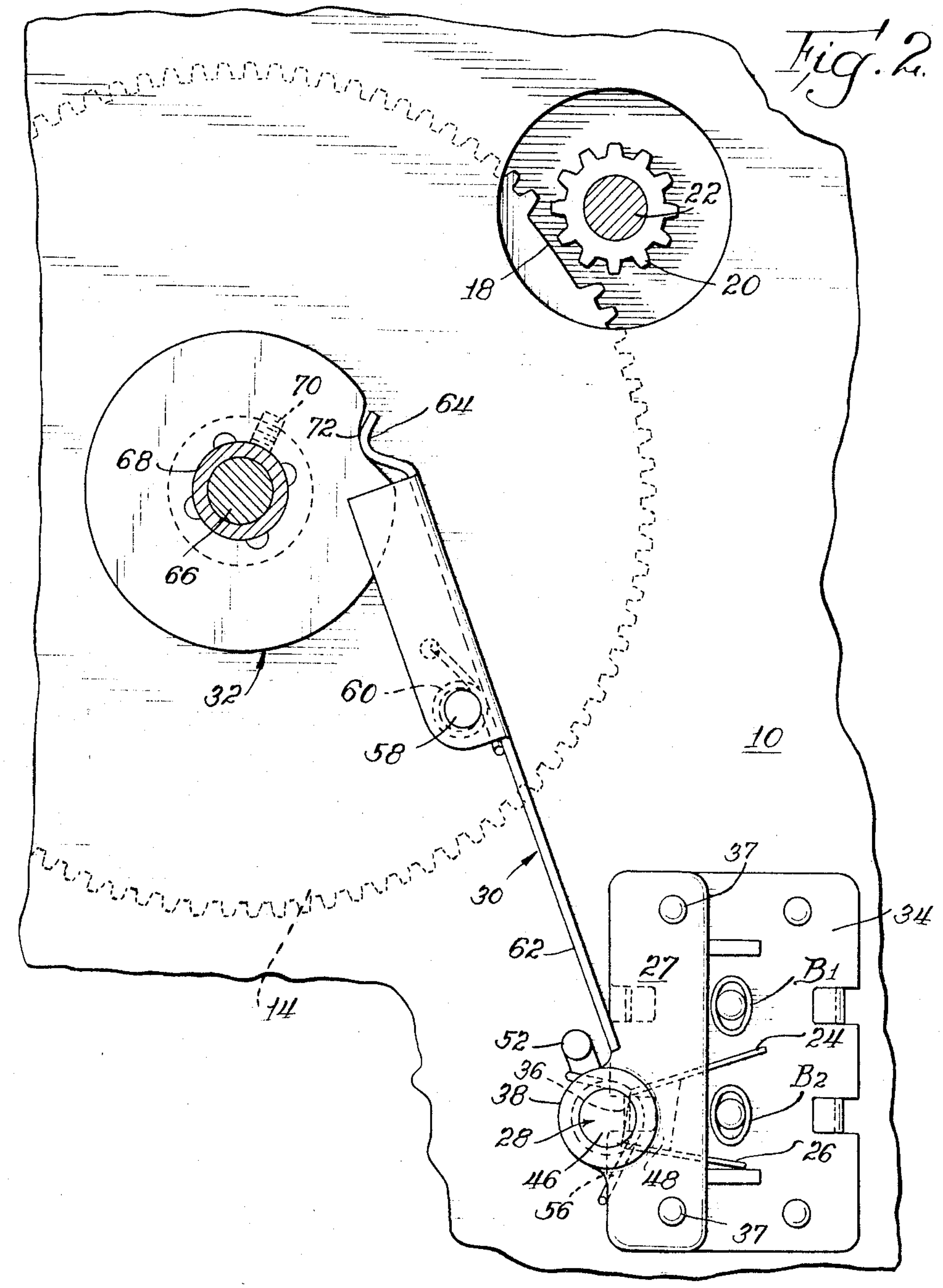
FIGURE 2 is a substantially enlarged fragmentary plan view looking at the top of the record changer of FIGURE 1 with the turntable removed so as to illustrate the muting switch and actuating mechanism therefor, the muting switch being shown in its normal open position.

Referring now to the drawings, FIGURE 1 shows the underside of an automatic record changer comprising a baseplate 10, a motor 12, a large diameter drive gear 14, and an actuator slide member 16 which is reciprocated by the drive gear 14 during a record change cycle for moving the tone arm (not shown) outwardly and dropping a record to be played to the turntable (not shown). As shown in FIGURE 2, the drive gear 14 is of a conventional type and has a few teeth removed to provide a recess 18. There is also shown a small diameter pinion 20 which is mounted on a turntable shaft 22 for rotation with the turntable. As is known in the art, the large drive gear 14 is normally positioned with the recess 18 adjacent the pinion 20, in which case the gear 14 will remain stationary even though the turntable and pinion are rotating. In order to initiate a record change cycle at the completion of the playing of a record, trip mechanism (not shown) is provided for rotating the large gear 14 sufficiently to cause it to mesh with the rotating pinion 20, whereupon the gear 14 will be driven one revolution until the recess 18 is again adjacent the pinion 20. Accordingly, it will be understood that the drive gear 14 is driven one revolution during each record change cycle, and at other times such gear remains stationary. In accordance with the present invention, actuating cam means is mounted for rotation with the drive gear 14 for effecting the closing of the muting switch during a record change cycle, as will be more fully described hereinafter.

Figures 3, 4:
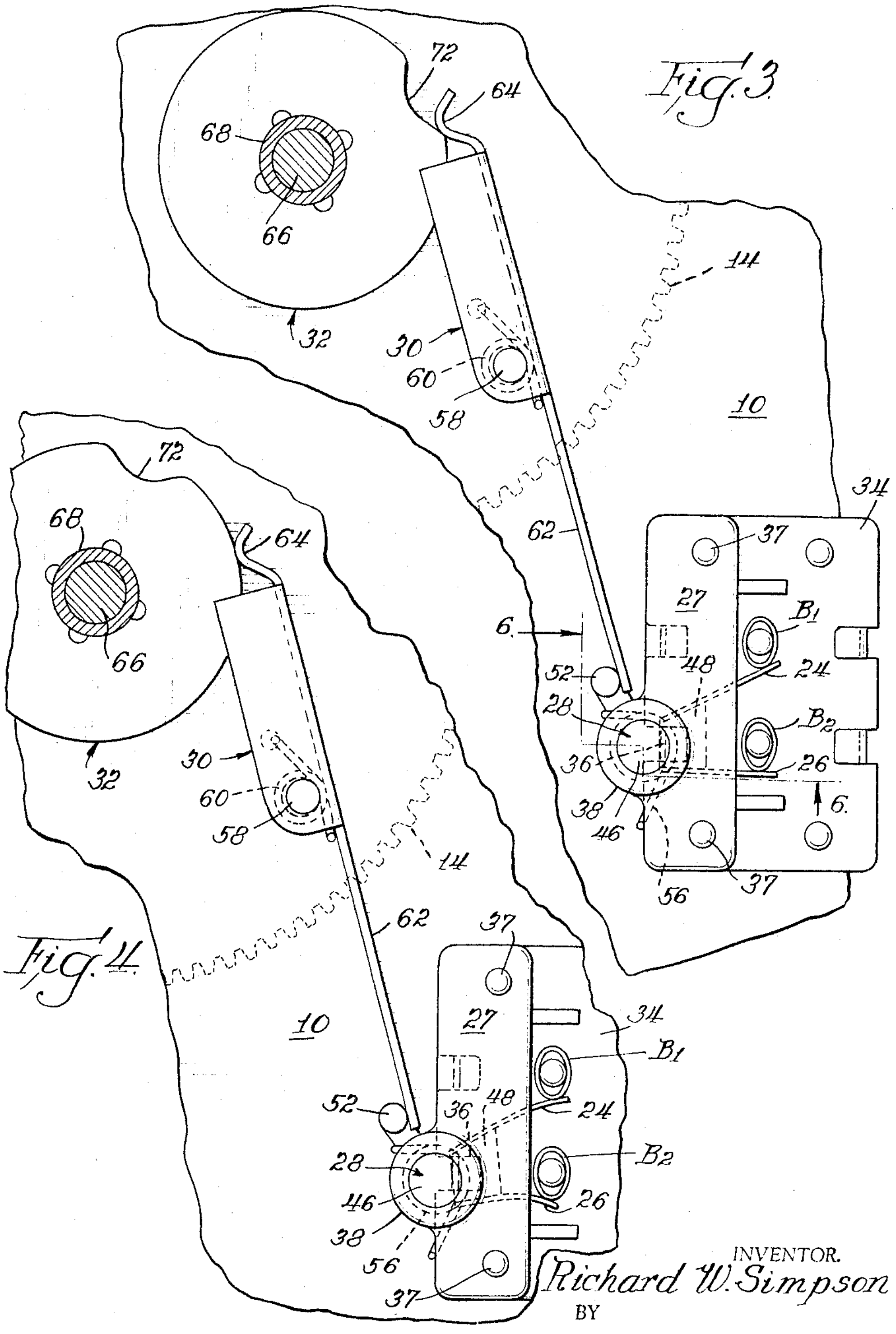
FIGURE 3 is a fragmentary view smiliar to FIGURE 2 showing the muting switch in the process of being closed by its actuating mechanism at the beginning of a record change cycle.
FIGURE 4 is another view similar to FIGURE 2 showing the muting switch in fully closed position.

As stated earlier, the muting switch of the present invention is combined with the phono jack of an automatic record changer by providing a switch having a pair of wiper blades which are arranged to contact the barrels of the phono sockets. FIGURE 2 shows the barrels $B_1$ and $B_2$ of the phono sockets extending upwardly from a socket base 34 which surmounts the baseplate 10, and there is also shown wiping blades 24 and 26, a switch body member 27, a rotor 28, an actuator 30, and a cam 32. In the embodiment being described, the several foregoing components are mounted at the top of the record changer baseplate 10 so as to lie under the turntable when the latter is assembled in position. As will be described more fully below, the cam 32 is mounted for rotation with the drive gear 14 whereby during a change cycle the cam will pivot the actuator 30 which in turn will rotate the rotor 28 to its closed position causing the wiping blades 24 and 26 to engage against the barrels $B_1$ and $B_2$ of the phono sockets as shown in FIGURE 4.

Figure 6:
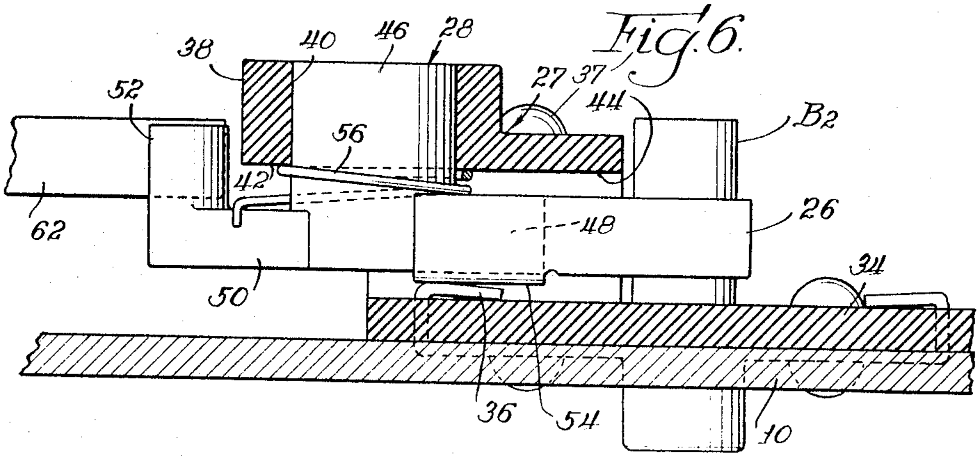
FIGURE 6 is a partial vertical section taken substantially along the line 6—6 of FIGURE 3.

FIGURE 6 shows the record changer baseplate 10, and immediately above the baseplate there is positioned the base portion 34 of the phono sockets. There is also shown a tab 36 from a ground lug of the phono socket, the tab being bent so as to lie substantially flat across the top of the phono socket base portion 34. The switch body 27 is mounted on top of the phono socket base 34 by suitable fastening means as shown at 37 in FIGURE 2. The switch body, which may be made of polystyrene or other like material, comprises a vertical boss or generally tubular sleeve portion 38 having a vertical cylindrical opening 40 therein, and in addition a pair of openings 42 and 44 are formed in the side of the boss 38 to permit parts of the rotor 28 to extend outwardly therethrough.

Figure 5:
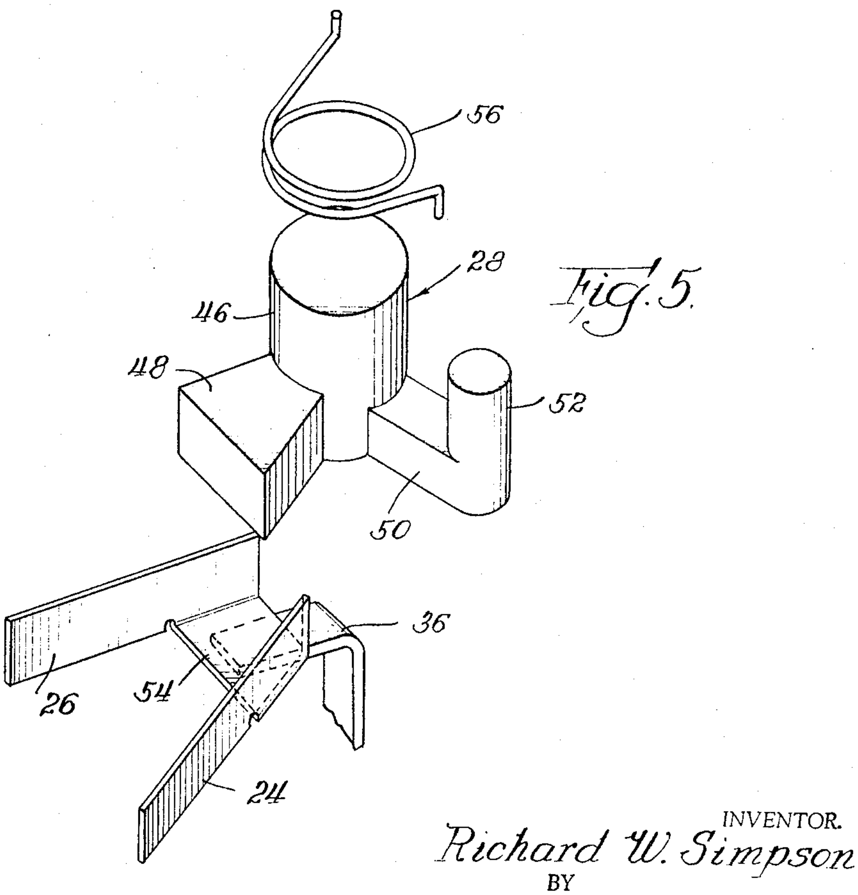
FIGURE 5 is a substantially enlarged exploded perspective view of a rotor assembly comprising a rotor, a pair of wiper blades carried by the rotor, and spring means for biasing the rotor to open position.

FIGURE 5 shows the rotor member 28 which may suitably be made of nylon or other like material. The rotor 28 includes an upright cylindrical main body portion 46, and integral with the body portion and projecting radially outwardly therefrom are a wiper blade support block 48 and an actuator arm 50. The actuator arm 50 has an upright small diameter stud or post 52 at the outer end thereof for cooperation with one end of the actuator lever 30. Also shown in FIGURE 5 is the wiping blade member which comprises the pair of flat flexible wiper blades 24 and 26 interconnected by a flat cross piece or bridge 54. The unitary wiping blade member may be formed from a single piece of suitable metal such as beryllium copper. It will be understood from the drawing that the wiping blade member is adapted to be pressed upwardly over the support block 48 of the rotor so that portions of the blades together with the cross piece 54 will clamp on the block and thereby cause the blade member to be secured to the rotor for rotation therewith. The cross piece or bridge 54 is thus disposed across the underside of the support block 48, and in this manner the wiper blades 24 and 26 are maintained in electrical contact with the tab 36 from the ground lug of the phono sockets, as will be described more fully hereinbelow.

The rotor 28 and wiping blade member, together with a rotor spring 56, are assembled with the switch body 27 in the manner shown in FIGURE 6. Such components are assembled so that the cylindrical body 46 of the rotor extends up into the cylindrical opening 40 in the sleeve portion 38 of the switch body so as to be rotatable therein. In addition, it will be noted that the blade support block 48 and wiper blades 24 and 26 project radially outwardly of the sleeve 38 through the opening 44, and the rotor actuator arm 50 and post 52 project outwardly of the switch body sleeve 38 through the opening 42 therein. The rotor spring 56 has one end anchored to the rotor 28 and its other end anchored to the switch body 27 so as to act as a torsion spring and bias the rotor toward its clockwise or open position as shown in FIGURE 2. In addition, the upper end of the spring 56 is supported by the switch body while the lower end bears down on the rotor, and in this manner the spring also urges the rotor downwardly so as to hold the bridge portion 54 of the wiper in engagement with the tab 36. Accordingly, the rotor 28 is rotatable between the clockwise open position of FIGURE 2 and the counterclockwise closed position of FIGURE 4, and at all times the bridge portion 54 of the wiper is maintained in sliding contact with the tab 36 so as to ground the wiper blades 24 and 26.

In order to actuate the rotor 28 during a record change cycle, the actuator lever 30 as shown in FIGURE 2 is pivotally mounted at the top of the baseplate 10 by a pivot pin or the like 58, and the lever is biased in a counterclockwise direction by a torsion spring 60. One end 62 of the actuator lever 30 is adapted to engage the stud 52 on the rotor arm 50 so that rotation of the actuator 30 in a clockwise direction will cause the rotor 28 to be rotated in a counterclockwise direction to the closed position of FIGURE 4. The actuator 30 may be of spring steel, and the arm 62 thereof is preferably flexible so as to permit overtravel. The other end of the actuator 30 includes an arcuate follower portion 64 which is adapted to ride on the surface of the cam 32.

As stated earlier, the cam 32 is adapted to rotate with the large diameter drive gear 14, and for this purpose the cam is mounted on the shaft 66 and keyed thereto in any suitable manner so as to be rotationally oriented relative to the gear 14. A hub member 68 is mounted over the end of the shaft 66 to hold the cam 32 thereon, and a set screw 70 is provided to fix the hub to the shaft. The hub 68 may of course be integral with the cam 32 if desired. The cam 32 is circular in its configuration except for a small recessed portion 72 which may extend over a total arc of approximately 40 degrees. The cam is rotationally oriented with respect to the drive gear 14 so that when the drive gear is in its normal stationary position as shown in FIGURE 2, the cam will be positioned with the arcuate follower portion 64 of the actuator 30 disposed in the cam recess 72. In the latter position of the cam 32, the actuator 30 will be in its counterclockwise position, and the rotor 28 will thus be in its clockwise open position as shown in FIGURE 2. Accordingly, the muting switch will normally be inoperative.

At the initiation of a record change cycle when the drive gear 14 and cam 32 begin to rotate, the follower portion 64 on the actuator 30 will ride up on the radially outer portion of the cam thus causing the rotor 28 to be rotated to closed position. FIGURE 3 shows the position of the rotor when the wiper blades 24 and 26 first make contact with the barrels $B_1$ and $B_2$ of the phono sockets, and FIGURE 4 shows the rotor in fully closed position wherein the wiper blades have been deflected somewhat as they move further toward the barrels. It will thus be understood that the flexible wiper blades have sufficient overtravel to allow positive wiping action against the barrels thus assuring a clean contact surface and reliable operation without oxidization of the contact area. It should also be noted that since the actuator arm 62 is a flexible spring steel member it will provide for overtravel so as to absorb tolerances and render the system less critical.

In actual practice with the preferred embodiment described herein, it has been found that the muting switch will close after approximately 7 degrees rotation of the cam 32, and the switch will open again after approximately 353 degrees of rotation. It will be understood that by operating from the main drive gear 14 it is possible to accurately control the position at which the muting switch is opened and closed. While there can of course be some variation in the selected cycle, it is preferable that the switch arrangement be designed so that the muting switch will always close after not more than 20 degrees rotation of the cam, and will never open before 340 degrees rotation thereof, since it is obviously desirable to have the muting switch operative during substantially the entire record change cycle.

Figure 7:
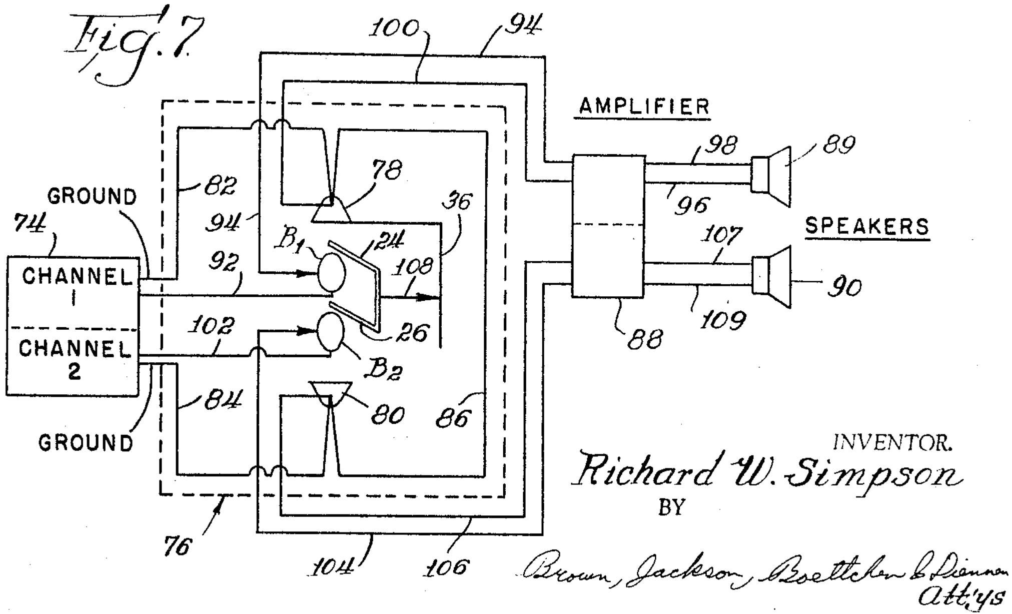
FIGURE 7 is a wiring diagram for the combination phono jack and muting switch of the present invention.

Reference is now made to FIGURE 7 which is a wiring diagram for the combined phono jack and muting switch of the present invention. There is shown a stereo cartridge 74 having two channels indicated as "Channel 1" and "Channel 2." The circuitry for the phono jack is shown enclosed within the dotted rectangle indicated generally at 76. Such circuitry includes a pair of ground lugs 78 and 80. A ground lead 82 extends from "Channel 1" to the lug 78, a second ground lead 84 extends from "Channel 2" to the lug 80, and a third lead 86 interconnects the lugs 78 and 80. There is shown an amplifier 88 and a pair of speakers 89 and 90. A lead 92 connects "Channel 1" of the cartridge to the barrel $B_1$ of the phono jack socket, and a lead 94 connects the barrel to the amplifier 88. The amplifier 88 is connected to speaker 89 by a pair of leads 96 and 98, and a lead 100 connects the amplifier back to the ground lug 78. In a similar fashion, a lead 102 connects "Channel 2" of the cartridge 74 to the barrel $B_2$ of the phono sockets, and the barrel is connected by a lead 104 to the amplifier 88. Also, a lead 106 connects the amplifier with the ground lug 80, and leads 107 and 109 connect the amplifier to the speaker 90.

It will be understood from the foregoing that there is a completed circuit from the channels of the cartridge 74 through corresponding ones of the phono socket barrels $B_1$ and $B_2$ to the amplifier 88 and then to respective speakers 89 and 90. FIGURE 7 also shows the tab 36 from the ground lug 78 of the phono socket, and an arrow 108 illustrates schematically the previously described sliding contact between the bridge portion 54 of the wiper blades 24 and 26 and the tab 36. It will thus be seen that when the blades 24 and 26 are brought into contact with the barrels $B_1$ and $B_2$, the system is grounded so as to prevent any signals from being transmitted.

It will be understood from the above description that the muting switch arrangement of the present invention provides an unusually simplified means for adding muting to an automatic record changer at a minimum of expense. Such a muting switch has been found to provide entirely satisfactory results and yet can be installed without requiring any wiring or soldering operations since there are no wires to the switch. As explained hereinabove, substantially all automatic record changers are provided with a phono jack, and in accordance with the present invention the muting switch includes switch elements such as wiping blades which are arranged to move into and out of contact with phono socket elements such as the barrels of the phono sockets. The muting switch elements or wiping blades are maintained grounded, and while this may be accomplished by disposing them in contact with any grounded element of the record changer, the preferred arrangement comprises maintaining the movable muting switch elements in contact with a grounded element or lug of the phono jack. Accordingly, since the switch elements are maintained grounded, and since the phono sockets comprise electrically positive elements of the system, the system can be shorted to ground and thereby muted by bringing the switch elements into contact with the phono sockets. It should be understood that while two phono sockets are illustrated in association with a stereo record changer having a stereo cartridge, for monaural play it is necessary only to provide a single channel cartridge, in which case only one operative phono socket and thus one movable muting switch element are required. The present invention can of course be used to advantage in conjunction with both monaural and stereo record changers. In the preferred embodiment, particularly in conjunction with record changers having a phono jack with a readily accessible ground lug or the like, it is only necessary to mount the muting switch body directly on top of the base of the phono sockets so that the wiper member will be in direct contact with such grounded lug, and with the movable switch elements or wiper blades adapted to move into contact with the phono socket members, in which case the installation is extremely simplified and all wiring operations are eliminated.

While I have illustrated my invention in a preferred form, I do not intend to be limited to that form, except insofar as the appended claims are so limited, since modifications coming within the scope of my invention will be readily suggested to others with my disclosure before them.

I claim:

1. In an automatic record changer of the type having a phono jack for transmitting signals from a cartridge to an amplifier, the improvement comprising, in combination, an electrically positive phono jack socket member, a muting switch including a grounded movable switch element, said switch being positioned in such a manner that said grounded switch element is movable into and out of contact with said phono jack socket member, means for biasing said muting switch to a normal open position wherein said switch element is out of contact with said phono jack socket member, and actuating means for moving said switch element into contact with said phono jack socket member during a record change cycle.

2. In an automatic record changer of the type having a phono jack for transmitting signals from a cartridge to an amplifier, the improvement comprising, in combination, an electrically positive phono jack socket member, a muting switch including a grounded movable switch element, said switch being positioned in such a manner that said grounded switch element is movable into and out of contact with said phono jack socket member, means for biasing said muting switch to a normal open position wherein said switch element is out of contact with said phono jack socket member, means including a rotatable cam for moving said switch element into contact with said phono jack socket member during a record change cycle, and means for rotating said cam one revolution during a record change cycle.

3. In an automatic record changer of the type having a phono jack for transmitting signals from a cartridge to an amplifier, the improvement comprising, in combination, an electrically positive phono jack socket member, a muting switch including a grounded flexible wiper blade element positioned for movement into and out of contact with said phono jack socket member, means for biasing said muting switch to a normal open position wherein said flexible wiper blade element is out of contact with said phono jack socket member, and actuating means for moving said switch element into contact with said phono jack socket member during a record change cycle.

4. In an automatic record changer of the type having a phono jack for transmitting signals from a cartridge to an amplifier, the improvement comprising, in combination, an electrically positive phono jack socket member, a grounded element, a muting switch including a movable switch element, said switch being positioned in such a manner that said switch element is movable into and out of contact with said phono jack socket member, means for biasing said switch element into contact with said grounded element and for biasing said muting switch to a normal open position wherein said grounded switch element is out of contact with said phono jack socket member, and actuating means for moving said switch element into contact with said phono jack socket member during a record change cycle.

5. In an automatic record changer of the type having a phono jack for transmitting signals from a cartridge to an amplifier, the improvement comprising, in combination, an electrically positive phono jack socket member, an electrically negative phono jack ground lug, a muting switch including a movable switch element, said switch being positioned in such a manner that said switch element is movable into and out of contact with said phono jack socket member, means for biasing said switch element into contact with said phono jack ground lug and for biasing said muting switch to a normal open position wherein said grounded switch element is out of contact with said phono jack socket member, and actuating means for moving said switch element into contact with said phono jack socket member during a record change cycle.

6. In an automatic record changer of the type having a phono jack for transmitting signals from a cartridge to an amplifier, the improvement comprising, in combination, an electrically positive phono jack socket member, an electrically negative phono jack ground lug, a muting switch including a wiper member having a flexible wiper blade element positioned for movement into and out of contact with said phono jack socket member, spring means for biasing said wiper member into contact with said phono jack ground lug and for biasing said wiper member to a normal open position wherein said grounded flexible wiper blade element is out of contact with said phono jack socket member, and actuating means for moving said grounded wiper blade element into contact with said phono jack socket member during a record change cycle.

7. In an automatic record changer of the type having a phono jack for transmitting signals from a cartridge to an amplifier, the improvement comprising, in combination, an electrically positive phono jack socket member, a grounded element, a muting switch including a rotor, a wiper member carried by said rotor and having a flexible wiper blade element positioned for movement into and out of contact with said phono jack socket upon rotation of said rotor, means for biasing said wiper member into sliding contact with said grounded element and for biasing said rotor to a normal open position wherein said grounded flexible wiper blade element is out of contact with said phono jack socket member, and actuating means for rotating said rotor to a closed position during a record change cycle for moving said flexible blade element into contact with said phono jack socket member, said actuating means being adapted to move said rotor beyond the position where said blade element first contacts said phono jack socket member so as to provide overtravel and effect flexing of said blade element thereby to produce a wiping action between said blade and said socket member.

8. In an automatic record changer of the type having a phono jack for transmitting signals from a cartridge to an amplifier, the improvement comprising, in combination, an electrically positive phono jack socket member, an electrically negative phono jack ground lug, a muting switch including a rotor, a wiper member carried by said rotor and having a flexible wiper blade element positioned for movement into and out of contact with said phono jack socket upon rotation of said rotor, spring means for biasing said wiper member into sliding contact with said ground lug and for biasing said rotor to a normal open position wherein said grounded flexible wiper blade element is out of contact with said phono jack socket member, actuating means including a rotatable cam for rotating said rotor to a closed position during a record change cycle for moving said flexible blade element into contact with said phono jack socket member, and means for rotating said cam one revolution during a record change cycle, said actuating means being adapted to move said rotor beyond the position where said blade element first contacts said phono jack socket member so as to provide overtravel and effect flexing of said blade element thereby to produce a wiping action between said blade and said socket member.

9. The invention of claim 8 wherein said actuating means further includes a pivotally mounted actuator arm having one end adapted to ride on the surface of said cam and having its other end positioned to effect rotation of said rotor member, said actuator arm including a flexible portion to permit overtravel thereby to absorb tolerances and render the system less critical.

10. In an automatic record changer of the type having a large diameter drive gear which is rotated one revolution during a record change cycle for effecting movement of the tone arm and dropping of a record to be played to a turntable, and having a phono jack for transmitting signals from a cartridge to an amplifier, the improvement comprising, in combination, an electrically positive phono jack socket member, a muting switch including a grounded movable switch element, said switch being positioned in such a manner that said grounded switch element is movable into and out of contact with said phono jack socket member, means for biasing said muting switch to a normal open position wherein said switch element is out of contact with said phono jack socket member, and actuating means for moving said switch element into contact with said phono jack socket member during a record change cycle, said actuating means including a cam connected to said large diameter drive gear for rotation therewith during a record change cycle.

11. The invention of claim 10 wherein said actuating means further includes a pivotally mounted actuator arm having one end adapted to ride on the surface of said cam and having its other end positioned to effect movement of said muting switch to a closed position wherein said switch element is in contact with said phono jack socket member, said actuator arm including a flexible portion to permit overtravel thereby to absorb tolerances and render the system less critical.

12. In an automatic record changer of the type having a large diameter drive gear which is rotated one revolution during a record change cycle for effecting movement of the tone arm and dropping of a record to be played to a turntable, and having a phono jack for transmitting signals from a cartridge to an amplifier, the improvement comprising, in combination, an electrically positive phono jack socket member, an electrically negative phono jack ground lug, a muting switch including a wiper member having a flexible wiper blade element positioned for movement into and out of contact with said phono jack socket member, spring means for biasing said wiper member into contact with said phono jack ground lug and for biasing said wiper member to a normal open position wherein said grounded flexible wiper blade element is out of contact with said phono jack socket member, and actuating means for moving said grounded wiper blade element into contact with said phono jack socket member during a record change cycle, said actuating means including a cam connected to said large diameter drive gear for rotation therewith during a record change cycle.

13. In an automatic record changer of the type having a large diameter drive gear which is rotated one revolution during a record change cycle for effecting movement of the tone arm and dropping of a record to be played to a turntable, and having a phono jack for transmitting signals from a cartridge to an amplifier, the improvement comprising, in combination, an electrically positive phono jack socket member, a grounded element, a muting switch including a rotor, a wiper member carried by said rotor and having a flexible wiper blade element positioned for movement into and out of contact with said phono jack socket upon rotation of said rotor, means for biasing said wiper member into sliding contact with said grounded element and for biasing said rotor to a normal open position wherein said grounded flexible wiper blade element is out of contact with said phono jack socket member, and actuating means for rotating said rotor to a closed position during a record change cycle for moving said flexible blade element into contact with said phono jack socket member, said actuating means including a cam connected to said large diameter drive gear for rotation therewith during a record change cycle, and said actuating means being adapted to move said rotor beyond the position where said blade element first contacts said phono jack socket member so as to provide overtravel and effect flexing of said blade element thereby to produce a wiping action between said blade and said socket member.

14. In an automatic record changer of the type having a large diameter drive gear which is rotated one revolution during a record change cycle for effecting movement of the tone arm and dropping of a record to be played to a turntable, and having a phono jack for transmitting signals from a cartridge to an amplifier, the improvement comprising, in combination, an electrically positive phono jack socket member, an electrically negative phono jack ground lug, a muting switch including a rotor, a wiper member carried by said rotor and having a flexible wiper blade element positioned for movement into and out of contact with said phono jack socket upon rotation of said rotor, spring means for biasing said wiper member into sliding contact with said ground lug and for biasing said rotor to a normal open position wherein said grounded flexible wiper blade element is out of contact with said phono jack socket member, a cam connected to said large diameter drive gear for rotation therewith during a record change cycle, and a pivotally mounted actuator arm having one end adapted to ride on the surface of said cam and having its other end positioned to effect rotation of said rotor member to closed position upon rotation of said cam, said actuator arm being adapted to move said rotor beyond the position where said blade element first contacts said phono jack socket member so as to provide overtravel and effect flexing of said blade element thereby to produced a wiping action between said blade and said socket member, and said actuator arm itself having a flexible portion to permit overtravel and thereby absorb tolerances and render the system less critical.

No references cited.

NORTON ANSHER, *Primary Examiner.*